United States Patent
Ehrmann et al.

(10) Patent No.: US 8,985,423 B2
(45) Date of Patent: Mar. 24, 2015

(54) PACKAGING MACHINE WITH DYNAMIC CHAIN TENSION

(75) Inventors: Elmar Ehrmann, Bad Grönenbach (DE); Ivo Ruzic, Kempten (DE)

(73) Assignee: Multivac SEPP Haggenmuller GmbH & Co. KG, Wolfertschwenden (DE)

( * ) Notice: Subject to any disclaimer, the term of this patent is extended or adjusted under 35 U.S.C. 154(b) by 860 days.

(21) Appl. No.: 13/063,097

(22) PCT Filed: Sep. 4, 2009

(86) PCT No.: PCT/EP2009/006456
§ 371 (c)(1),
(2), (4) Date: May 24, 2011

(87) PCT Pub. No.: WO2010/028783
PCT Pub. Date: Mar. 18, 2010

(65) Prior Publication Data
US 2011/0220699 A1 Sep. 15, 2011

(30) Foreign Application Priority Data

Sep. 11, 2008 (DE) .......................... 10 2008 046 902

(51) Int. Cl.
*B65H 23/188* (2006.01)
*B65B 9/04* (2006.01)
(Continued)

(52) U.S. Cl.
CPC ................ *B65B 9/04* (2013.01); *B65H 23/188* (2013.01); *B65B 59/02* (2013.01); *B65G 23/44* (2013.01)
USPC .......................................................... 226/172

(58) Field of Classification Search
CPC ...................................................... B65H 23/188
USPC .......................... 226/24, 42, 44, 100, 170–173
See application file for complete search history.

(56) References Cited

U.S. PATENT DOCUMENTS 4,284,192 A * 8/1981 Taylor ........................... 198/813
4,372,172 A * 2/1983 Gombocz et al. ......... 73/862.392
4,593,893 A * 6/1986 Suter .......................... 270/52.12
(Continued)

FOREIGN PATENT DOCUMENTS

CA 2 470 604 A1 12/2004
DE 35 02 664 A1 7/1986
(Continued)

OTHER PUBLICATIONS

German Search Report Dated Aug. 27, 2009, Applicant Multivac Sepp Haggenmueller GmBH & Co., Application No. 10 2008 046 902.5, 3 Pages.
(Continued)

*Primary Examiner* — William E Dondero
(74) *Attorney, Agent, or Firm* — Husch Blackwell LLP

(57) ABSTRACT

The invention relates to a packaging machine, in particular a thermoformer, traysealer, comprising at least two transport chains for transporting a web of material, such as a film or the like. The packaging machine is characterized in that sensor means are provided for detecting the chain length and/or the chain pitch and/or the chain tension of the transport chains, means being provided for stretching and/or relaxing at least one individual transport chain, and control means being provided for adapting different lengths or chain pitches of two transport chains by stretching and/or relaxing at least one transport chain in a controlled manner.

21 Claims, 2 Drawing Sheets

Figure 1:
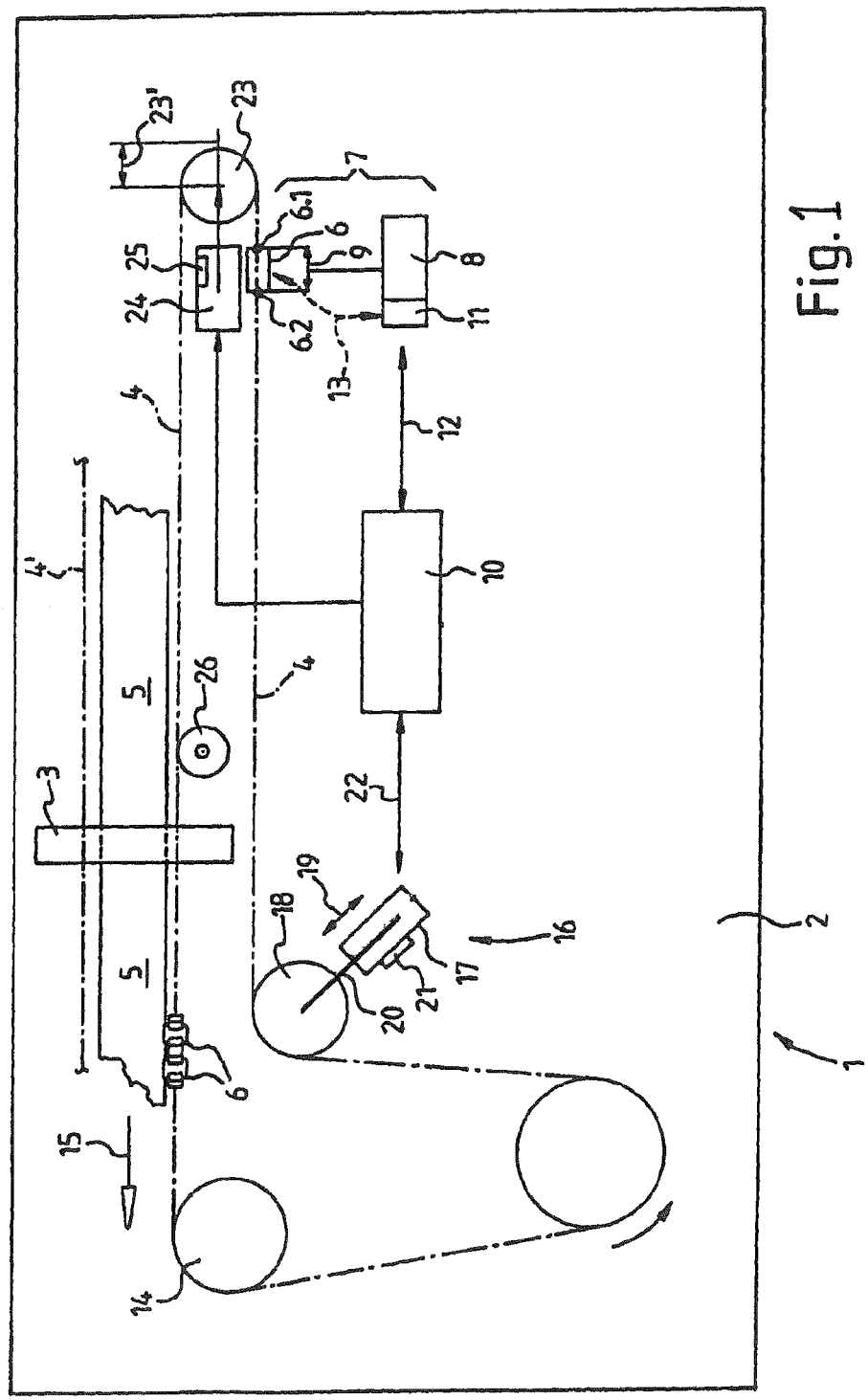

(51) Int. Cl.
  *B65B 59/02*    (2006.01)
  *B65G 23/44*    (2006.01)

(56) References Cited

U.S. PATENT DOCUMENTS

| | | | | |
|---|---|---|---|---|
| 4,897,985 | A | * | 2/1990 | Buchko et al. .................. 53/559 |
| 5,079,729 | A | * | 1/1992 | Nowakowski ................ 700/279 |
| 5,337,885 | A | * | 8/1994 | Mills et al. ................. 198/502.4 |
| 5,641,058 | A | | 6/1997 | Merten et al. |
| 2004/0226805 | A1 | * | 11/2004 | Lodge ...................... 198/810.02 |
| 2005/0056720 | A1 | * | 3/2005 | Natterer ...................... 242/564.3 |
| 2005/0183932 | A1 | | 8/2005 | Angleitner |

FOREIGN PATENT DOCUMENTS

| | | |
|---|---|---|
| DE | 197 41 838 A1 | 3/1999 |
| DE | 199 04 146 A1 | 8/2000 |
| DE | 101 52 891 A1 | 5/2003 |
| DE | 103 26 727 B3 | 8/2004 |
| DE | 101 52 891 B4 | 1/2005 |
| DE | 10 2005 007 976 A1 | 8/2006 |
| DE | 10 2005 044 537 B3 | 10/2006 |
| DE | 10 2006 006 185 A1 | 8/2007 |
| EP | 1 564 165 A1 | 8/2005 |
| GB | 2 034 655 A | 6/1980 |

OTHER PUBLICATIONS

International Search Report Dated Feb. 15, 2010, Application No. PCT/EP2009/006456.

* cited by examiner

PACKAGING MACHINE WITH DYNAMIC CHAIN TENSION

CROSS-REFERENCE TO RELATED APPLICATIONS

This application is the U.S. national phase of PCT Application No. PCT/EP2009/006456, which claims priority to German application 10 2008 046 902.5 filed Sept. 11, 2008, the disclosures of which are incorporated in their entirety by reference herein.

TECHNICAL FIELD

The present invention relates to a packaging machine and a method for operating the same according to the preambles of claims 1 and 19.

BACKGROUND

DE 10 2006 006 185 A1 describes a packaging machine, which comprises transport means transporting a film web by a certain feed length in a cyclic manner in a direction of transport and in which said feed length can be modified according to the lengthening of the transport means. Such packaging machines may comprise e.g. forming, filling, sealing and separating stations. Since such machines often have a length of from 10 m to 20 m and more, the lengthening of the transport means, which are normally configured as transport chains, becomes increasingly important as regards precise guidance of the film web through the packaging machine.

When the two chains, which fix and guide the packaging film on its outer edges, lengthen, the packaging trays formed in the film will be displaced in the direction of transport. This displacement may interfere with the correct sequence of packaging steps to such an extent that the packaging in question will no longer fulfil the respective quality standards and will have to be rejected.

In order to avoid such failures, this publication therefore suggests that the lengthening of the transport means should be measured and that its feed length should be adapted on the basis of this measurement.

The same topic underlies DE 101 52 891 B4, which suggests that, in response to a change in the chain length, the feeding step of the transport unit should be changed or the distance between a forming station and a punching station should be varied. The tensile stress of the transport chain is maintained constant throughout the whole conveying step. The relative position of a chain tensioner tensioning the transport chain is determined by means of a sensor and transmitted to a control unit, so that the latter will be able to detect an e.g. temperature-dependent variation of length of the chain and/or a variation of the tensile force of the transport chain. It follows that this detection of the chain condition depends on two parameters. On the one hand, the change in the chain length and, on the other hand, the pretensioning force applied to the chain tensioner. The control unit is, however, not able to detect in this way which of the parameters changed.

DE 10 2005 044 537 B3 discusses a change in the length of the transport chains for thermoforming machines. In this publication it is suggested that, during the transport step of the film, a reduced tensioning force should be applied to the transport chains so as to reduce the frictional resistance and the wear of the chain. At standstill, an increase in the tensioning force is to be effected so that an identical reproducible force will always prevail in the two transport chains and so that comparable values and, consequently, a change in the length of the transport chains can be measured via a position measuring system.

SUMMARY

It is the object of the present invention to improve a packaging machine according to the prior art specified at the beginning as well as a method of operating the same.

Accordingly, a packaging machine according to the present invention is characterized in that sensor means are provided for detecting the chain length, the chain pitch and/or the chain tension of the transport chains, means being provided for stretching and/or relaxing at least one individual transport chain, and control means being provided for adapting different lengths or chain pitches of two transport chains by stretching and/or relaxing at least one transport chain in a controlled manner.

It is thus possible to reduce or fully prevent a possible displacement of a web to be conveyed, e.g. of a film between the two transport chains, which may be caused by different lengths of the transport chains. The immediate adaptation of the two chain lengths influences the magnitude which directly affects the synchronicity of the two transport chains. It follows that a substantially improved operation will be possible by adapting the chain lengths.

The chain pitch is the quotient between the number of chain links and the length of the chain so that, in the case of a constant number of chain links, the chain pitch directly depends on the chain length.

By continuously detecting the length, the pitch or the tension of the transport chains, measurement data can be recorded along the entire transport chain in accordance with an advantageous embodiment of the invention. In particular, the detection of the chain length, chain pitch and/or chain tension can also be carried out during operation, so that a change in these magnitudes can immediately be responded to. The chain length, chain pitch and/or chain tension may vary during operation e.g. due to an elongation of the chain. Due to the continuous detection of the length, pitch and/or tension of the transport chains in particular during operation, such an embodiment of the invention will be able to directly adapt, without interrupting the operation of the machine, the chain lengths or the chain pitches of the two transport chains by stretching and/or relaxing at least one chain.

According to a special embodiment of the present invention, the sensor means comprise a pretensioning roll for detecting the chain length, chain pitch and/or chain tension. A pretensioning roll, which is installed under pretension, e.g. the pressure of a spring, in the circulation path of a transport chain, can provide a measure for the chain length and, consequently, also for the chain pitch through a change in its position and, due to the pretension applied to the pretensioning roll at a specific position thereof, it can also provide a measure for the chain tension.

The pretension may be caused e.g. via a spring. For pretensioning the spring, a spindle motor and a spindle driven thereby may be used. Making use of such means, the tensile stress can be changed easily by positioning the spindle in an appropriate manner relative to the spring element. If a change in the length, pitch and/or tension/tensile force of the transport chain is desired, the spindle is rotated such that the tension spring is compressed and thus pretensioned for applying a stronger force to the chain. If a reduction of the chain tension is desired, this process is predetermined by the control unit and, controlled via the sensor, executed in the reverse direction of action.

According to a further development of the present invention, the adaptation of the chain length or chain pitch is executed only within a predetermined interval of the chain tension. The basis for this is that the increase or the decrease of the chain tension occurring during stretching or relaxing of the chain has to be limited with respect to safe operation. On the one hand, a safe operation of the machine requires a minimum tension of the transport chains; on the other hand, the tension to which the transport chains are subjected should not exceed a maximum tension.

The control unit may, for example, also generate an alarm signal if the desired adaptation of the chain length or of the chain pitch will not be possible within the predetermined chain tension interval. In the case of such an indication, suitable maintenance work, e.g. the replacement of the transport chains, can be executed in dependence upon such an event.

According to a preferred embodiment, the control means comprise a dynamic control for adapting the lengths or the pitches of subareas of the transport chains which pass a specific position during operation. This embodiment is based on the idea that, as regards the operation of the packaging machine, it is, in the final analysis, the upper run that is of essential importance in the area of the processing stations. In principle, a chain may have different chain pitches in different subareas, but, as regards the synchronous running of the two transport chains, it is of essential importance that the chains run synchronously in the area of the work stations, so that a packaging machine according to the present invention can be improved still further by continuously examining the relevant subareas of the transport chains and by adapting their lengths or their chain pitches to one another, if necessary, by stretching or relaxation.

The term "dynamic control" means the continuous detection of the lengths or of the pitches of the transport chains in their entirety or of subareas of the respective transport chain running at the moment in question through respective sections of the circulation path, and the continuous control so as to adapt this measured length or pitch to a target value. It follows that a chain, while circulating, may be stretched or relaxed to different degrees at different positions so as to accomplish an appropriate adaptation to the other chain.

According to a preferred embodiment, there are provided a threshold value for the chain length and/or the chain pitch as well as indication means for indicating a wear limit when said threshold value has been exceeded. This means that, in the case of an excessive elongation of the chain, it will be indicated that the chain is worn so that a replacement can be carried out. Such a threshold value may be valid for the whole chain length or for a specific minimum length of a chain section, e.g. a specific number of chain links, whose chain section length or chain pitch must be below such a threshold value.

The sensor means provided may e.g. be a force sensor which directly detects the tensile stress prevailing in the transport chain and transmits it to a control unit, either as an analog value, e.g. in the form of a voltage, or in a state in which it has already been processed through a possibly provided additional evaluation unit as a corresponding value for the measured force. It is, however, also imaginable to provide a path sensor which detects e.g. the path of a force element, e.g. of an adjusting element, and which, with due regard to a conversion factor, e.g. a spring constant, is able to transmit to the control unit a resultant information on the tensile stress measured in the transport chain.

According to a preferred embodiment, the chain length, chain pitch and/or chain tension in the circulatorily driven chain may, for differentiated detection, also be measured along a plurality of points along the chain. It is thus possible to respond, if necessary, with different measures in individual chain sections.

One possible embodiment is so conceived that, for influencing the chain length, the chain pitch and/or the chain tension, the control unit can predetermine a target value in dependence upon the actual value in the same transport chain and/or in an additional transport chain. When considering the values prevailing at the moment in question in the respective transport chain, the operation carried out may e.g. be a corrective control of a not sufficiently precisely adjusted value for the chain. The operation carried out may, however, also be an increase in or a reduction of the chain length, chain pitch and/or chain tension relative to the prevailing actual value so as to achieve e.g. a more uniform lengthening of the individual chain links in the transport chain. Due to the compensation of the chain lengths by means of tensioning or stretching and/or relaxing, a compensation of a possibly occurring transport displacement between the first boundary area and the second boundary area of the film to be conveyed will be achieved.

According to another preferred embodiment, also measuring means may be provided for determining the length of an individual link and/or of a plurality of links of the transport chain.

This course of action is based on the finding that not only the chain as a whole lengthens, but that at least individual chain links undergo different changes in length in comparison with other chain links during operation of the packaging machine. This results in different film guidance vectors during transport of the film through the packaging machine due to one or possibly also a plurality of chain links along the film guide path which have been lengthened to a higher degree or to a lesser degree in comparison with the other chain links or which may not yet have been lengthened at all.

Such different chain lengths may, in a disadvantageous manner, also cause tensile forces which act transversely in the film web and which may e.g. cause a wrinkle formation tendency in the film. This may have the effect that the contours of the packaging trays formed in the film become distorted after relaxation of the film, so that the originally provided geometries of said trays are no longer maintained.

The cause of such different degrees of link lengthening may e.g. be jerky loads in the transport chain, or only in a subsection of the transport chain, in the case of which the links located between two points of engagement with the chain may sometime be elongated substantially and permanently, whereas especially chain links which are at the moment in question located in a guide means, such as a gear, may not be acted upon by such a jerky load and may therefore not undergo a corresponding elongation.

Chain links located in an area of the transport chain having arranged therein e.g. a chain tensioner, which provides e.g. a certain elastic compensation of the chain tension and which is thus able to prevent excessive loads on the respective chain links in this area, may be subjected to lower loads. Ideally, these chain links will not be lengthened either, at least, however, they will be lengthened less than the chain links in whose row the jerky load occurred. Taking all this into account, a different lengthening of the links and the resultant non-uniform guidance of the film cannot be avoided in the long run. For counteracting the resultant distortion of the film, such lengthening of the chain, which may be extremely non-uniform especially in specific subsections, should be compensated for at least partially.

In order to allow a particularly precise detection of the length of an individual chain link and/or of a plurality of chain links, a preferred embodiment can be so conceived that a length measuring means is provided in a running area of the transport chain in which the transport chain is under tensile stress. It is thus possible to measure the chain link when it is extended in full length. The same applies to the measurement of a plurality of chain links; to this end, a measurement of each individual chain link may be provided as well as the measurement at predeterminable intervals, e.g. every second, every fifth, every tenth link or the like.

The most exact detection of a change in the length of the transport chain is, however, accomplished by a detection each individual chain link. On the basis of this course of action, a control unit, which has supplied thereto the relevant data, can cause an optimization of the transport of the film through the packaging machine.

A control unit in the sense of present invention is a unit which may comprise feedback control as well as control functionalities for individual elements of the packaging machine as well as for a plurality of such elements, specially preferred for all the elements of the packaging machine which are to be controlled. For this purpose, e.g. a microprocessor can be provided, specially preferred a microprocessor with suitable peripheral components.

The measuring means may preferably comprise a sensor which detects the length of the respective link and/or of the respective links indirectly or directly and which transmits a signal representative thereof to the control unit. In the case of direct detection, the sensor can be configured such that it is independently suitable for detecting the length and for transmitting a value representative thereof to the control unit. In the case of indirect detection, the sensor may e.g. supply a signal to the control unit which indicates to the latter the presence of the chain link part to be examined, so that the control unit will be able to determine, in combination with the conveying speed of the transport chain, the length of the chain link to be measured. The sensors suitable for this purpose are e.g. optical, inductive, capacitive sensors.

According to a particularly preferred embodiment, a specific chain link may also be marked. By means of this mark, the position of the chain link in question on the circulation path of the transport chain can be tracked precisely via a suitable control unit and adequate measures for compensating different degrees of lengthening of chain links can be initiated by said control unit. The higher the number of marked chain links tracked on the circulation path is, the more precise the realization of a suitable control of the progressive film feed will be.

To this end, the control unit may especially monitor at least a drive and/or a tensioning means of the transport chain, so that, for taking into account a detected change in the length of a chain link, also a reduction of or an increase in the driving speed of the chain drive in question can be effected for the purpose of length compensation during operation. In a particularly advantageous manner, also the chain length and/or the chain tension may here be influenced simultaneously.

For maintaining a specific chain tension, a chain tensioning means may be provided. This chain tensioning means may e.g. comprise a deflection pulley whose axis can, by means of an adjusting element, provided e.g. in the form of a cylinder, a spring or the like, be varied such that the tensile stress in the chain can be influenced in this way. The variation via an active adjustment element, such as a cylinder, has the advantage that the tensile stress in the chain can be updated in accordance with respective requirements. The detection of the tensile stress in the transport chain can take place e.g. via a path sensor, a force sensor or the like. Also in this case, optical, inductive as well as capacitive sensors are well suited for path detection on the basis of a change in position of the chain tensioner.

Tensile force detection by means of a force sensor can take place e.g. on the basis of a pressure and/or tension sensor.

As regards the tensile stress in the transport chain, a tensioning means according to a first embodiment can be arranged such that the transport chain can be tensioned thereby along the entire length thereof. This will, for example, be possible when a driven element, e.g. a sprocket wheel, is provided along the transport chain guide path and when all the other guiding elements are implemented as passive elements, i.e. as element having no drive of their own. Pretensioned via the chain tensioner, the transport chain will be able to consider, as has already been explained hereinbefore, in the film-conveying area different degrees of lengthening of individual chain links by an adequate change in the advance rate so as to accomplish for the film web a conveying speed that is as uniform as possible. In this way, it is, however, also possible to accomplish a more precise positioning of the film and, consequently, of the packaging trays which are to be formed in said film and which are to be filled, sealed and separated.

According to the transport progress of chain links stretched to a higher or lesser degree, the resultant film transport performance of said chain links can, along the whole transport path, be adapted, in comparison with neighbouring chain areas comprising chain links that are stretched to a different degree, not only by length compensation but also through a change in the conveying speed such that a predominantly uniform transport through the packaging machine will be possible for the film web.

To this end, at least one additional drive for at least one transport chain can be provided in an advantageous manner. According to a particularly advantageous embodiment, it is even possible to provide a plurality of additional drives for a transport chain along the length thereof, in particular along the length that conveys the film, and to control them in a specially preferred manner separately so as to achieve the above described advantages of the packaging machine.

It is thus also possible to counteract e.g. transverse stresses, which become effective in an oblique direction across the film, such that in the areas in question a relative differential speed will be imparted to the transport chains until these transverse stresses have been eliminated. When the distortion of the film has been compensated, the two chains can be driven in this area such that they will cause a continuously uniform film transport speed in this area.

According to a particularly advantageous embodiment, such a uniform film transport speed resulting in the least possible distortion of the film is to be provided in the areas in which the film is processed e.g. by means of a work station, such as a preheating station, a thermoforming station, a filling station, a sealing station and/or a separating station. In this respect, it may be of advantage when between such areas, in which the film is to be guided in the best possible manner, so-called buffer areas are realized, in which a distortion of the film will intentionally be admitted, if necessary, so that the film can thus be conveyed uniformly in the above described processing areas in a state in which it is as relaxed a possible.

In addition to the provision of a plurality of drives for a respective chain along the chain guide means, it is additionally possible to provide a minimum value and/or a maximum value for the tensile stress in the respective transport chain. While the packaging machine is in operation, the chains can be operated within this tensile stress range, the tensile stress prevailing in at least one further chain being additionally taken into account in a particularly preferred manner. It would thus e.g. be possible to counteract a distortion of the film web at least to a certain extent by increasing the tensile stress in a chain. If the tensile stress were continuously increased, the chain in question would eventually reach its maximum value so that a further increase in tensile stress would have the effect that the maximum tensile stress value would be exceeded. In this case, a reduction of the tensile stress in the second chain can be provided so as to cause, at least in a specific film transport section, the same relaxation effect. The above described facts apply analogously when the tensile stress and, consequently, the chain length are reduced, so that also in this respect the length and/or the tension of the other chain is taken into account upon determining the length of the first chain. It may be particularly advantageous when the tensile stress in both chains fluctuates approximately in the mean range between the minimum and the maximum tensile stress values, so that, in both directions, a compensation of approximately identical magnitude for the chain length and/or the chain tension can be provided for improved film guidance.

According to a further preferred embodiment, the control unit can be configured such that it will be able to adapt the actual position of an individual chain link and/or of a plurality of chain links with respect to the target position which should be occupied by the respective chain link without a detected change in length for one and/or a plurality of chain links in the respective running area of the transport chain. This can be achieved especially by the above-described influence on the chain transport speed and/or the chain length and/or the tension/tensile stress in the chain.

According to a second aspect, the present invention relates to a method of operating a packaging machine according to the above described embodiments.

DETAILED DESCRIPTION

BRIEF DESCRITION OF THE DRAWINGS

The accompanying drawings form a part of the specification and are to be read in conjunction therewith, in which like reference numerals are employed to indicate like or similar parts in the various views.

Figure 2:
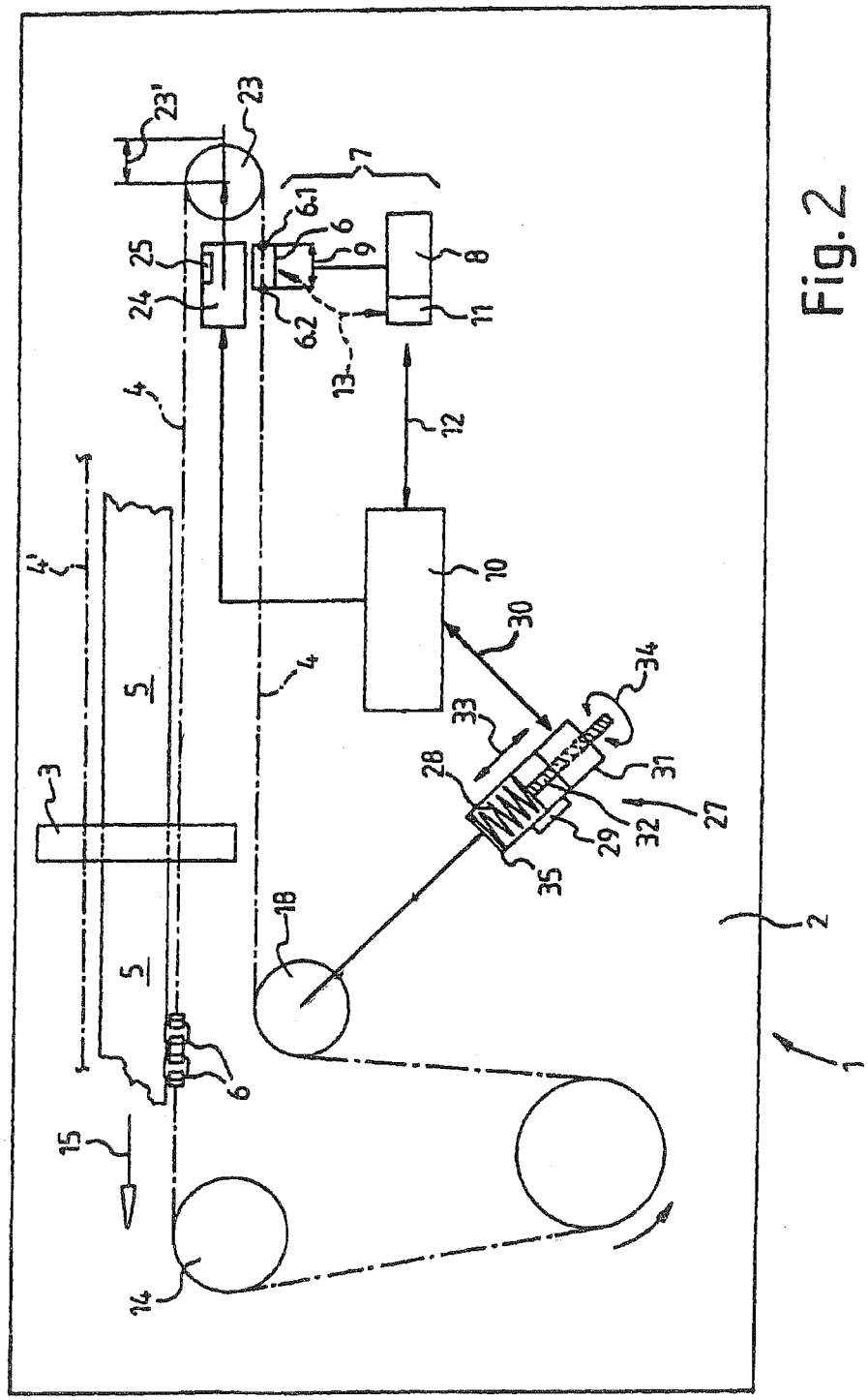

FIG. 1 shows a schematic view of one embodiment of a packaging machine having dynamic chain tension in accordance with the teachings of the present disclosure; and FIG. 2 shows a schematic view of another embodiment of a packaging machine having dynamic chain tension in accordance with the teachings of the present disclosure.

In the following, embodiments of the present invention are exemplarily described in more detail on the basis of the figures enclosed.

Accordingly, FIG. 1 shows exemplarily and schematically a packaging machine 1 with a frame 2 and an exemplarily shown work station 3, which stands for a plurality of work stations that may be provided if necessary, as well as two transport chains 4, 4' for transporting a web of material 5 through the packaging machine 1. Only by way of example, two chain links 6 are shown on the transport chain, which serve to seize, fix and transport the film through the packaging machine.

For determining the length of such a link of the transport chain, measuring means 7 are provided in a running area of the transport chain in which the latter is under tensile stress. By applying a sufficient tensile stress to the transport chain 4, the links of said transport chain are stretched apart to their full longitudinal extension in the chain section in question, so that said longitudinal extension can be detected. The transport chain 4' is, only symbolically, shown as a short section, but, in principle, the features of chain 4 apply in the same way also to said transport chain 4'.

A sensor 8 is here shown as an exemplary measuring means for determining the longitudinal extension of the chain links. This sensor detects the length 9 between the two points 6.1 and 6.2 symbolizing the beginning and the end of a chain link 6 and transmits it, as is also exemplarily shown according to arrow 12, to a control unit 10.

A mark, which is provided on the chain link 6 and which is here symbolically shown as a digit 1, can be detected by a detection means 11, as shown symbolically by the dashed arrow 13, and can also be made known to the control unit, so that the latter will know, with due regard to the feed of the transport chain, the respective precise position of the chain link as well as the longitudinal extension of said chain link detected by the sensor 8.

On the basis of this longitudinal extension, the control unit 10 will be able to appropriately influence the chain length, the chain pitch and/or the chain tension and/or the conveying speed of the respective transport chain and/or of the other transport chain and, consequently, the conveying speed of the film web 5 to be conveyed by the transport chains. A distortion in the film web caused by different conveying speeds originating from different longitudinal extensions of individual chain links can be counteracted in this way.

To this end, the control unit 10 may vary the speed of the drive 14 so that the transport chain 4 driven thereby will be able to transport the film web 5 in a predominantly uniform conveying movement through the packaging machine 1 in accordance with the direction of arrow 15.

In order to be able to apply to the transport chain 4 a chain tension and thus the resultant chain length, so that said transport chain 4 can be guided reliably and safely via its guide elements, a chain tensioner 16 is shown, again exemplarily, said chain tensioner 16 being used for adjusting the tensile stress prevailing in the transport chain by means of a cylinder 17 and a deflection pulley 18. The variation in the movement of the cylinder and, symbolically, the resultant variation in the tensile stress of the conveying chain 4 is indicated by arrow 19. However, this arrow 19 also symbolizes the variation of a distance in the case of a variation of the piston force by a displacement of the piston rod 20. For detecting the chain tension, a sensor 21 is shown, again exemplarily, which, in cases in which the tensile stress is determined through pressure or tension, is configured as a force sensor so that the tension in the chain can be transmitted directly via the measured force. It is, however, also imaginable to detect a distance with the piston rod 20, so that, possibly with due regard to a force known through a respective pressure applied to the cylinder for pretensioning the chain, a longitudinal elongation of the chain can be detected via the path sensor. A connection to the control unit 10 is here, again exemplarily, shown symbolically by means of the arrow 22.

Another possibility of stretching and/or tensioning the chain is, again exemplarily, shown through a chain tensioner 24 acting on a deflection pulley 23. The same possibilities of applying a tensile stress and of detecting said tensile stress as well as of detecting the length of the transport chain, which have already been described in connection with the chain tensioner 16, exist here in an analogous manner. In correspondence with sensor 21, a sensor 25 is here exemplarily shown, and arrow 23' is here shown for the relative movement according to arrow 19.

FIG. 1 illustrates an embodiment which provides additional tension control capability. In order to be able to apply different speeds and/or tensile stresses to individual subareas along the conveying path of the transport chain, it may additionally be of advantage to provide at least one additional drive 26 for the transport chain 4 so that, in this example, the distance between the two deflection pulleys 14 and 23 is divided at the point of application of the transport roller 26 as shown in FIG. 1. By means of this division the chain areas located upstream and downstream of the drive 26 can be influenced separately with respect to the tensile stress in the transport chain as well as with respect to the conveying movement thereof. This allows a reduction of a relative advance or delay in the movement of the film caused by chain links which are, in comparison with the other chain links, longer stretched or shorter stretched than said other chain links, and to thus prevent the resultant formation of wrinkles in the film. Alternatively, FIG. 2 shows another embodiment that does not include an additional drive 26 and, therefore, the chain tensioning mechanism relaxes and/or stretches a transport chain substantially along its entire length.

As shown in FIG. 2, an alternative embodiment for applying a tensile stress to the transport chain 4 or 4' are, again exemplarily, shown in axial alignment with the chain tensioner 16 in the form of additional adjusting means 27 symbolically connected to the deflection pulley 18. These adjusting means 27 comprise a spring element 28 with a defined spring constant so that, according to the compression path of this spring element, a pressure can be applied to the deflection pulley 18 which is mechanically connected therewith and, consequently, to the transport chains 4 and 4', respectively. By means of the sensor 29, the spring excursion can be detected and made available via the connection 30 to the control unit 10, also said connection 30 being only shown exemplarily and symbolically. This can be done either in the form of an analog value or, directly processed by a unit, as a path or force value.

Alternatively or additionally, it would also be possible to detect and transmit the tensioning force in the chain by a pressure sensor 35, which is again shown symbolically.

For adjusting the spring pretension and thus the tensile stress acting on the transport chains 4, 4', a spindle motor 31 and a spindle 32, which is adapted to be moved by said spindle motor according to the directions of arrow 33, are here exemplarily provided. Depending on the direction of rotation of arrow 34, the spindle is rotated towards the deflection pulley 18 thus increasing the compression of the spring element 28 and, consequently—in a manner that can simultaneously be controlled by the sensor(s) 29 and/or 35—the tensile stress in the respective transport chain 4 and 4'. For reducing the tensile stress, the spindle motor has to be driven in the opposite direction so that the spindle will relieve the spring element, whereupon the latter relaxes and the tensile stress in the transport chain can be reduced.

Since the same influencing possibilities are fundamentally provided for the second transport chain 4', which is exemplarily shown only in a certain section thereof, also differences in the degree of chain link extension between chain 4 and chain 4' can be taken into account in such a way that, depending on the detected degree of extension of one or of a plurality of chain links, the transport chain in question will, in this transport area, be moved less fast or its tensile stress will be reduced and/or the second chain will possibly be moved faster or its tensile stress will be increased, or vice versa, so as to reduce, or prevent even completely a distortion of the film between these two portions of the two transport chains. In a particularly preferred manner, a maximum or minimum value for the respective chain will here be taken into account for applying a tensile stress to the respective chain. In an additionally advantageous manner, also the tensile stress in the respective other transport chain will be taken into account, and, in a particularly preferred manner, approximately a mean value between the maximum value and the minimum tensile stress value is aimed at in both chains so as to provide approximately the same compensation possibility in both directions.

The invention claimed is:

1. A packaging machine comprising:
   at least two transport chains for transporting a web of material;
   at least one sensor for detecting a chain length and/or a chain pitch and/or a chain tension of the at least two transport chains;
   at least one chain tensioning mechanism for stretching and/or relaxing at least one of the at least two transport chains independent of another one of the at least two transport chains; and
   a control unit for compensating for differences in the chain lengths or chain pitches of the at least two transport chains using the at least one chain tensioning mechanism to stretch and/or relax at least one of the at least two transport chains in a controlled manner independent of another one of the at least two transport chains.

2. A packaging machine according to claim 1 wherein the at least one sensor continuously detects the chain length and/or the chain pitch and/or the chain tension of the at least two transport chains.

3. A packaging machine according to claim 1 wherein the at least one sensor detects the chain length and/or the chain pitch and/or the chain tension during operation of the at least two transport chains.

4. A packaging machine according to claim 1 wherein the at least one sensor comprises a pretensioning roll for detecting the chain length and/or the chain pitch and/or the chain tension by varying a position of said pretensioning roll.

5. A packaging machine according to claim 1 wherein the control unit adapts the chain length or the chain pitch only within a tension interval of the at least two transport chains.

6. A packaging machine according to claim 1 wherein the control unit comprises a dynamic control for adapting the lengths or the pitches of one or more subareas of the at least two transport chains which pass a specific position during operation.

7. A packaging machine according to claim 1 wherein said control unit generates an alarm signal to indicate a wear limit when a threshold value for the chain length and/or the chain pitch has been exceeded.

8. A packaging machine according to claim 1 wherein the control unit determines a target value for the chain length and/or the chain pitch and/or the chain tension in at least one of the at least two transport chains in dependence upon the chain pitch of at least one chain link of one or more of the at least two transport chain.

9. A packaging machine according to claim 1 further comprising a second sensor for determining a length of an individual link and/or of a plurality of links of one or more of the at least two transport chains.

10. A packaging machine according to claim 1 wherein the control unit tracks a position of at least one-chain link of at least one of the at least two transport chains.

11. A packaging machine according to claim 10 wherein the control unit tracks the position of the at least one chain link using a mark disposed on at least one chain link.

12. A packaging machine according to claim 1 wherein the at least one chain tensioning mechanism comprises a drive and/or a tensioning device for at least one of the at least two transport chains, and the control unit controls the operation of the drive and/or the tensioning device.

13. A packaging machine according to claim 12 wherein the one of the at least two transport chains is guided such that the at least one chain tensioning mechanism relaxes and/or stretches the one of the at least two transport chains substantially along the entire length thereof.

14. A packaging machine according to claim 12 wherein the at least one chain tensioning mechanism relaxes and/or stretches the one of the at least two transport chains in a subsection of a running area of the one of the at least two transport chains.

15. A packaging machine according to claim 12 wherein the at least one chain tensioning mechanism comprises an additional drive for the one of the at least two transport chains.

16. A packaging machine according to claim 1 wherein at least one of the at least two transport chains has a minimum and/or a maximum tensile stress.

17. A packaging machine according to claim 1 wherein the at least one sensor comprises a force and/or path sensor for detecting the tensile stress in the one of the at least two transport chains.

18. A packaging machine according to claim 1 wherein the control unit is configured such that it controls the at least one chain tensioning mechanism such that the one of the at least two transport chains is relaxed and/or stretched to different degrees in individual subsections of a running area of the one of the two transport chains.

19. A packaging machine according to claim 1 wherein the control unit adapts the chain length, the chain pitch and/or the chain tension in the one of the at least two transport chains in dependence upon a detected change in the length of an individual chain link and/or of a plurality of chain links in a subsection of a running area of at least one of the at least two transport chains during operation.

20. A packaging machine according to claim 1 wherein each of the at least two transport chains have an initial chain length at the commencement of operation, the sensor detects the chain length of each of the at least two transport chains during operation, and the control unit adapts one of a drive and the at least one chain tensioning mechanism of at least one of the at least two transport chains based upon an actual position of an individual chain link and/or of a plurality of chain links of the one of the at least two transport chains at the detected chain length in relation to a target position of the individual chain link and/or of the plurality of chain links at the initial chain length of each of the at least two transport chains.

21. A method of operating a packaging machine comprising at least two transport chains for transporting a web of material, and a chain tensioning mechanism for applying a tensile stress to at least one of the at least two transport chains independent of another one of the at least two transport chains, said tensile stress being determinable by a control unit, the method comprising:
 detecting a chain length, a chain pitch and/or a chain tension prevailing in the at least two transport chains during operation; and
 compensating for differences between the detected chain lengths or the detected chain pitches of the at least two transport chains by stretching and/or relaxing at least one of the at least two transport chains independent of another one of the at least two transport chains.

* * * * *